(12) United States Patent
Duggan et al.

(10) Patent No.: US 9,282,429 B2
(45) Date of Patent: Mar. 8, 2016

(54) SCALABLE REAL-TIME LOCATION DETECTION BASED ON OVERLAPPING NEURAL NETWORKS

(71) Applicant: Consortium P, Inc., Rochester, NH (US)

(72) Inventors: Robert J. Duggan, Strafford, NH (US); Dragan Vidacic, Exeter, NH (US)

(73) Assignee: CONSORTIUM P, INC., Rochester, NH (US)

( * ) Notice: Subject to any disclaimer, the term of this patent is extended or adjusted under 35 U.S.C. 154(b) by 1 day.

(21) Appl. No.: 14/267,046

(22) Filed: May 1, 2014

(65) Prior Publication Data

US 2014/0329540 A1 Nov. 6, 2014

Related U.S. Application Data

(60) Provisional application No. 61/818,565, filed on May 2, 2013.

(51) Int. Cl.
*H04W 24/00* (2009.01)
*H04W 4/02* (2009.01)
*G01S 5/02* (2010.01)

(52) U.S. Cl.
CPC .............. *H04W 4/02* (2013.01); *G01S 5/0289* (2013.01)

(58) Field of Classification Search
CPC ....... G01S 5/0289; G01S 17/66; G01S 17/87; G01S 5/06; H04W 4/02; H04W 84/18; H04W 24/08; H04W 28/021; H04W 40/12
See application file for complete search history.

(56) References Cited

U.S. PATENT DOCUMENTS

| 5,586,223 | A | 12/1996 | Bryant et al. |
| 2005/0143101 | A1 | 6/2005 | Kyperountas et al. |
| 2006/0111123 | A1* | 5/2006 | Nerat ........................ 455/456.1 |
| 2007/0087761 | A1 | 4/2007 | Anjum et al. |
| 2009/0046152 | A1* | 2/2009 | Aman ........................... 348/157 |
| 2009/0059816 | A1* | 3/2009 | Reza et al. .................... 370/256 |

(Continued)

FOREIGN PATENT DOCUMENTS

JP 2004266835 A1 9/2004

OTHER PUBLICATIONS

PCT Search Report for PCT Application No. PCT/US2014/036305, Sep. 2, 2014, 13 pages.

(Continued)

*Primary Examiner* — Ajit Patel
(74) *Attorney, Agent, or Firm* — Maine Cernota & Rardin

(57) ABSTRACT

A system and method for real-time location detection consists of three groups of components. Mobile subjects to be tracked are equipped with wireless transceivers capable of sending and optionally for receiving data over pre-determined radio frequency (RF) band(s). Router/base station access point devices are equipped with wireless transceivers capable of sending and receiving data over pre-determined radio frequency (RF) band(s) in order to communicate with mobile units. Routers are combined into specific overlapping router groups, with each group forming a spatial sub-network. System central processing and command station(s) perform data processing and implementation of computational models that determine the mobile unit location. System deployment consists of three phases: collection of training and testing data, network training and testing, and network adaptive maintenance.

20 Claims, 10 Drawing Sheets

SYSTEM ARCHITECTURE

(56) References Cited

U.S. PATENT DOCUMENTS

2009/0280827 A1    11/2009   Michaud
2011/0028161 A1*   2/2011   Larsen .................. 455/456.1
2013/0023282 A1*   1/2013   Lin et al. ............... 455/456.1

OTHER PUBLICATIONS

Ahmad, Uzair et al., "In-Building Localization Using Neural Networks", IEEE, 2006, 6 pages.

* cited by examiner

SYSTEM ARCHITECTURE

205 DEPLOYED NETWORK DEVICES

210 SUB-NETWORK 1 (OUTLINED)

215 SUB-NETWORK 2 (OUTLINED)

220 SUB-NETWORK 3 (OUTLINED)

TOPOLOGIES OF OVERLAPPING MULTIPLE NETWORK MODELS

SUB-NETWORK ENGAGEMENT BY MAX COUNT FOR SIGNAL RECEPTION

FEED FORWARD NEURAL NETWORK ARCHITECTURE OF EACH SUB-NETWORK

SYSTEM DEPLOYMENT PHASES

OPERATION STEPS

NETWORK OUTPUT COMPUTATION

NETWORK RESPONSE STEP 810 OF FIGURE 8

SAMPLING STEPS

SCALABLE REAL-TIME LOCATION DETECTION BASED ON OVERLAPPING NEURAL NETWORKS

RELATED APPLICATION

This application claims the benefit of U.S. Provisional Application No. 61/818,565 filed May 2, 2013. This application is herein incorporated in its entirety by reference.

FIELD OF THE INVENTION

The invention relates to wireless object location tracking and, more particularly, to a system and method for object location detection employing interrelated overlapping neural networks.

BACKGROUND OF THE INVENTION

Real Time Location Systems (RTLSs) track objects, typically by associated tags. For individuals, a badge is used for tracking in environments such as health-care facilities, warehouses, and other areas where location is important. Personnel badges and asset tags may include Radio Frequency Identification (RFID) (passive or active), and communicate with fixed or hand-held readers.

While known tags and communication standards such as Wi-Fi (802.11) may hold the potential for full-scale deployment—tracking many objects in real-time—in reality, they fall short. For example, accuracy is impaired by an inability to overcome multipath effects of the tracking environment. Time delays from processing bottlenecks result when realistic quantities of objects are tracked. This leads to stale, inaccurate, object location indications and even loss of tracking.

What is needed are systems to monitor the location of people and items in real-time that scale with the requirements of the application.

SUMMARY OF THE INVENTION

Embodiments of the present invention include a system and method for real-time location detection of a wireless transmitter. Embodiments include an RFID tag or other communication device with transmitting capability. While embodiments apply to indoor real-time tracking, system deployment is not limited to this and systems can be deployed outdoors, or in combination. Embodiments apply in other scenarios.

An embodiment provides a scalable system for real-time location determination of at least one object by sub-networks of interrelated neural networks comprising at least one transmitting tag associated with each of at least one object; a plurality of a priori defined interrelated location classifier sub-networks comprising location classifier receivers; the location classifier receivers configured to receive at least one transmission from at least one transmitting tag; wherein the system is configured to engage only one of the plurality of sub-networks to output a location of at least one object; and whereby scaling of the system is achieved by engaging only one sub-network of the plurality of sub-networks to output the location for each of at least one object. In another embodiment the sub-networks of interrelated neural networks overlap spatially. For a following embodiment at least one transmitting tag is configured to receive at least one physical measurement value from at least one router/base station/access point and transmit at least one physical measurement value to a system central server processing and command station. In subsequent embodiments the system is configured to select a sub-network having the greatest number of the location classifier receivers receiving at least one transmission from at least one transmitting tag; and at least one transmitting tag is configured to receive at least one signal from at least one router/base station/access point. For additional embodiments the system is configured to collect training and testing data for deployment; use the training and testing data for system training and testing; and perform adaptive error monitoring and tracking. In embodiments the configuration for adaptive error monitoring and tracking comprises monitoring tracking error through periodic adaptive cycles by correcting network outputs based on readings from reference transmitters at known locations. In included embodiments the system is configured to collect sampled data comprising recording identification of routers that did not receive a sampling packet from a particular spatial coordinate location. In yet further embodiments the sub-networks are configured for training comprising direct data, wherein the data is unfiltered or unsmoothed or unfiltered and unsmoothed. In ongoing embodiments the sub-networks do not spatially overlap.

An additional embodiment provides a method for scalable real-time location determination of at least one object by sub-networks of interrelated neural networks comprising the steps of defining the sub-networks of interrelated neural networks a priori; collecting training data by sampling; training the sub-networks of interrelated neural networks on the training data; testing the sub-networks of interrelated neural networks on the training data; operating the sub-networks of interrelated neural networks, engaging only one of the sub-networks to output a location of the at least one object; and adaptively monitoring and tracking errors. For a following embodiment the sampling step comprises repeating the sampling at specific time intervals to acquire temporal variations in an environment related to RF signal propagation. In subsequent embodiments the step of training the sub-networks is performed according to a scaled conjugate gradient method, and backpropagation is used to obtain derivatives of performance with respect to connection weights and bias vectors of the sub-network. In embodiments a network response comprises re-scaling input data; calculating initial intermediate results; passing a vector arg1 through a function arg2; calculating subsequent intermediate results; and re-scaling a last result. Included embodiments comprise processing missing readings and extreme variations in received signal strength indicator (RSSI) values with a Centroid k-means filter. Other embodiments comprise processing extreme variations in received signal strength indicator (RSSI) values with a median filter. Further embodiments comprise processing extreme variations in received signal strength indicator (RSSI) values with backfilling. In ensuing embodiments computation of each of the sub-network's outputs comprises centering and normalizing input data; calculating a network response; and calculating a sub-network output tag position from a network output vector. In yet further embodiments a sub-network transformation equation comprises $l = nn_i(rssi_i)$. In subsequent embodiments a neural layer response comprises $s_i = f(W_{i-1,i} s_{i-1} + b_i)$.

A yet further embodiment provides a scalable system for real-time location determination of at least one object by overlapping sub-networks of neural networks comprising at least one transmitting tag associated with each of at least one object; the overlapping sub-networks comprising a plurality of flexible topology, a priori defined, interrelated sub-network location classifiers comprising receivers; receiving at least one transmission from at least one transmitting tag at least one of the receivers; processing at least one received transmission in the overlapping sub-networks of neural networks on at least one central processing and command station; wherein only one of the sub-networks is engaged to output a location of at least one object; and whereby the scaling is achieved by engaging only one sub-network of the plurality of sub-networks to output the location for each of at least one object.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
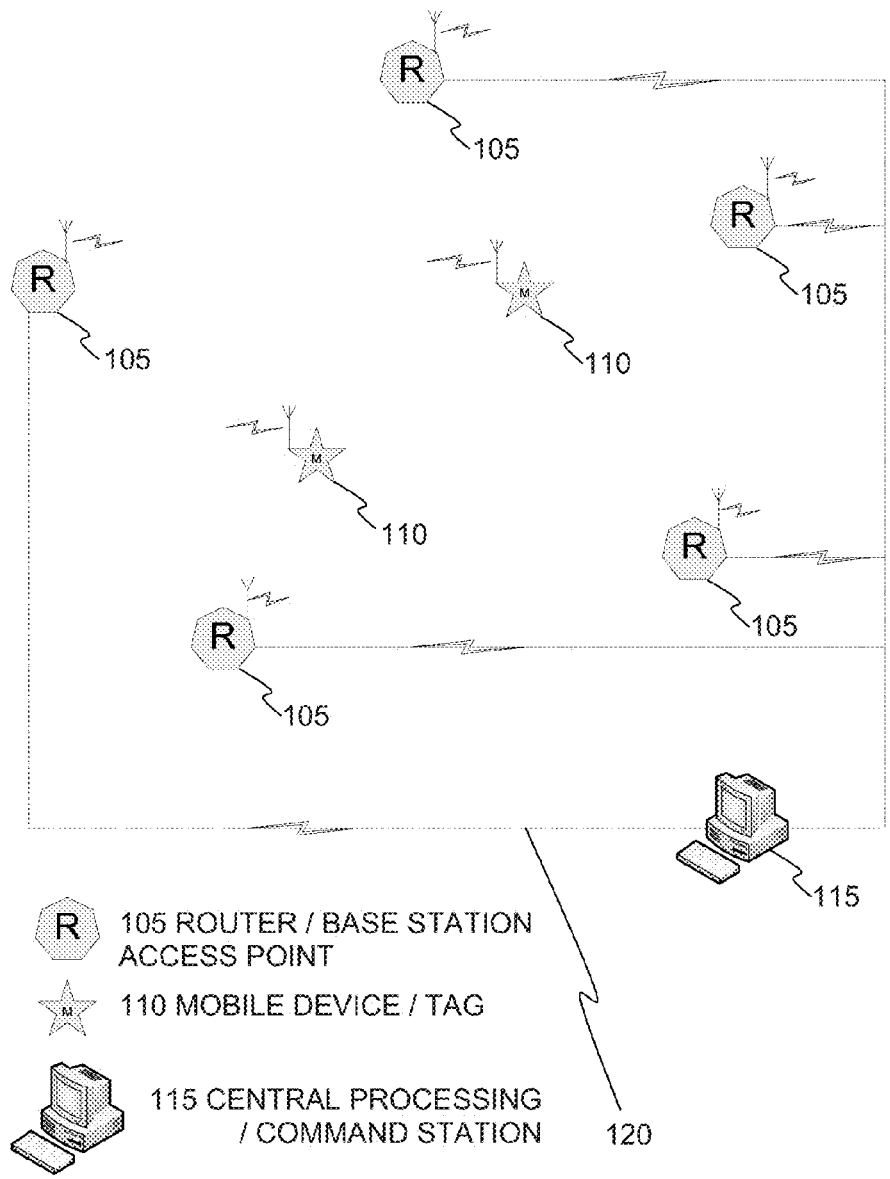
FIG. 1 is a depiction of a system architecture configured in accordance with an embodiment of the invention.

Multiple, interrelated, neural networks provide real time location data that scales to accurately track a large number of objects for real world applications. System operation includes training, operation, and adaptive error correction. Embodiments use two types of data to train a network. One data type is generated data from mathematical models of indoor electromagnetic field propagation. The other data type is from actual sampled data inside the facility. Embodiments use either one type or the other type of data, or both types can be merged and used simultaneously for training. This training is basically presenting the neural network a plurality of different patterns for it to generate a representative transfer function. Each pattern associates some physically measureable property (for example electromagnetic signal strength, vibration, magnetic field orientation, atmospheric pressure, acceleration, rotational rate, time of arrival, or time of flight), with a position in three dimensional space. Invention description particulars are organized in four sections including System Architecture, Location Detection Model, Location Model Deployment Configuration, and Data Collection System Training and Network Generation. The system for real-time location detection consists of three groups of components. I. Mobile devices to be tracked are equipped with wireless transceivers capable of sending, and optionally for receiving, data over pre-determined radio frequency (RF) band(s). II. Router/base station/access point devices equipped with wireless transceivers capable of sending and receiving data over one or more pre-determined RF band(s) in order to communicate with mobile units. Routers are combined into specific router groups, with each group forming a spatial sub-network. Embodiments include non-spatial sub-networks, ex. by object type. III. In embodiments, system central processing and command station(s) perform data processing and implementation of computational models that determine the mobile unit location. For embodiments, system deployment consists of three phases: A comprising collection of training and testing data; B comprising neural network training and testing; and finally C comprising operation and network adaptive maintenance.

Embodiments use received signal strength indicator (RSSI) measurements on the routers; alternative embodiments also use the RSSI measured on the mobile units. As mentioned, in addition to electromagnetic signal strength, vibration, magnetic field orientation, atmospheric pressure, acceleration, rotational rate, time of arrival, and time of flight are nonlimiting examples of other physical properties used.

In embodiments, modularity/scaling is implemented using overlapping, a priori-defined sub-networks. By a priori, it is meant that the layout of the sub-networks is defined before system operation begins. The spatially overlapping organizational structure ensures that any combination of inputs results in an adequate location determination. For embodiments, a router can be in more than one sub-net. Selection of the sub-network to be engaged for a particular tag is based on a count of routers/access points and RF transceiver communication links. In embodiments, the sub-network with the maximum count of such communication links is selected. In embodiments, ties are resolved by alternate selection. Advantages of this method include a smaller number of classifiers (i.e. neural networks) necessary to cover a specific area. As another example of advantages, the method has surprisingly reduced memory requirements. No 'visibility matrix module' selection logic is necessary.

During regular run-time, missing readings from certain locations as well as extreme variations in RSSI values are simultaneously handled by the implementation of data back-filling, Centroid (k-means), and/or median type filters. By centroid, it is meant the intersection of all hyperplanes in n-dimensional space that divide a geometric shape into two parts of equal moment. k-means embodiments provide unexpectedly good results considering the issues with computational difficulty (NP-hard) and the sensitivity to the number of input clusters, k. NP-hard refers to non-deterministic polynomial-time hard in computational complexity theory. In embodiments, missing readings means zero RSSI values. In embodiments, extreme variations means near minimum/maximum reading values or, where readings are similar in value to each other, for example, double or triple the similar value.

For embodiments, no filtering or smoothing operations are implemented on training data sets. The approach is that for each particular location, typical scenarios involve a large amount of data, and the classifiers should exhibit tolerance, as much as possible, to extreme scenario cases of missing data. Additionally, during the training phase, there is no implementation of a missing data filter to get rid of extremely small RSSI values. Finally, neural model targets and outputs can either be continuous coordinates or discrete locations.

System Architecture

As previously introduced, embodiments of the system for real-time location detection consist of three major groups of components. I. Mobile devices to be tracked. These are equipped with wireless transmitters/transceivers capable of sending and, for embodiments, receiving the data over pre-determined radio frequency (RF) band(s).

II. Router/base station access point devices. In embodiments, these are equipped with wireless transceivers capable of sending and receiving data over pre-determined radio frequency (RF) band(s) in order to communicate with mobile units. Embodiments of these devices are also capable of relaying data received from mobile units to other system modules via wired or wireless links.

III. System central processing and command station(s). Embodiments perform the data processing and implementation of the computational models that determine the mobile unit location in the system central processing and command station(s). Embodiments of these stations (typically a server type device) are also capable of sending specific messages to all other units in the system.

FIG. 1 depicts an embodiment of a system architecture 100. Components comprise Router/Base station access points 105, Mobile devices 110, and Central Processing/Command station 115. Data transfer between Central Processing/Command 115 and Mobile units 110 is relayed via Router stations 105. The exchange of the information between router stations and central processing/command units can be done via wired or wireless links 120. The spatial topology of the system network (i.e. router locations) is not fixed, but for embodiments needs re-training after router relocation, and does not have to conform to any particular placement selection rule. In embodiments, the placement of routers is governed by actual in-field requirements and limitations. Each device in the system has a unique identifier or address. In embodiments, communication between various wireless system devices is accomplished through one or more specific communication protocols assuming both non-synchronized (pseudo-random transmissions) and synchronized operation (TDMA-like operation).

Location Detection Model

Embodiments of the method for location detection are based on the Received Signal Strength Indicator (RSSI) readings forwarded from routers/base station access points and mobile transceivers that receive a communications packet to/from the mobile unit. Nonlimiting examples of other physical properties used embodiments of the location determining method comprise vibration, magnetic field orientation, atmospheric pressure, acceleration, rotational rate, time of arrival, and time of flight. In embodiments, system routers are combined into specific router groups with each group forming the spatial sub-networks for the system. Core aspects of the location determination method are based on a neural network based pattern recognition solution.

Nomenclature defines a system having N router units placed throughout the indoor environment in a particular 3-D scheme. The distribution of routers does not have to be strictly uniform and does not have to conform to any specific grid structure. For embodiments, a sub-network can be defined to include all N routers.

Figure 2:
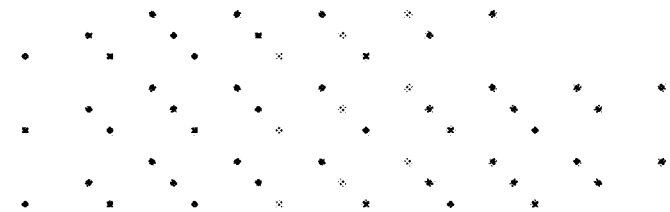
FIG. 2 is a depiction of a flexibly uniform topology of an overlapping multiple sub-network model configured in accordance with an embodiment of the invention.
Figure 2:
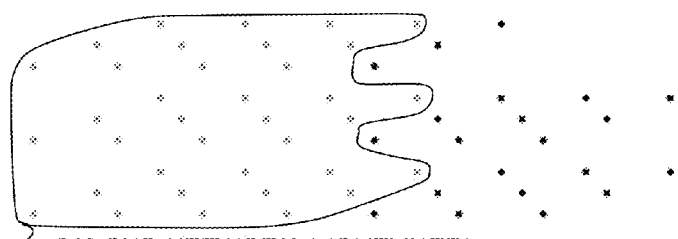
Figure 2:
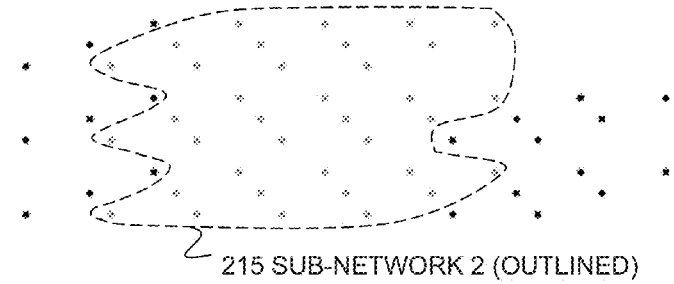
Figure 2:
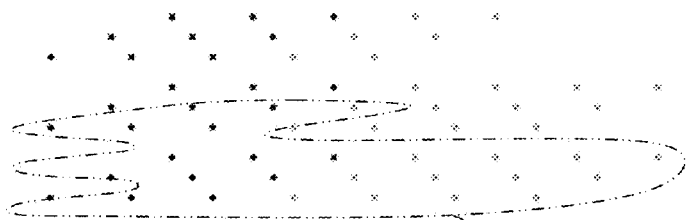

FIG. 2 is an example of a uniform-type router distribution 200 provided to more easily visualize 3-D system topology. In illustrating the topology of the Overlapping Multiple Network Model, specific sub-network components are distinguished with router-dots 205.

The particular example of the system shown in FIG. 2 presents a network containing three sub-networks 210, 215, and 220. Sub-networks can overlap—the case depicted in FIG. 2 shows the model with three sub-networks having common routers. For some embodiments, a router can be in more than one sub-net. In embodiments, overlap can be spatial and or by any measured or defined parameter. Sub-network 215 routers are depicted within a dashed outline. Each sub-network can contain any number of routers and can also be isolated from the rest of the system without actually overlapping with any other sub-network. Assume the system has M sub-networks. The number of routers that belong to sub-network i is Ni. Embodiments of the mobile device location method assume that each system sub-network is associated with the transformation described as:

$$l = nn_i(\text{rssi}_i) \quad (2.1)$$

where l is the location vector, $nn_i()$ is the neural-network transformation function for a particular system sub-network and $(\text{rssi}_i)$ is the vector containing all Ni RSSI readings from routers/mobile transceivers that belong to the sub-network i. Vector l has dimensions 3×1 and its components correlate with detected coordinates of the particular mobile transmitter. The neural network transfer function is typically a non-linear transform (embodiments include linear models) that can be represented through matrix-vector multiplication operations as well as additional mapping of intermediate results. Exact neural mapping form depends on the chosen parameters of neural networks associated with each sub-network. Regarding terminology, distinctions between a particular neural network assigned to the specific router sub-network and the router sub-network itself will not necessarily be explicit.

Figure 3:
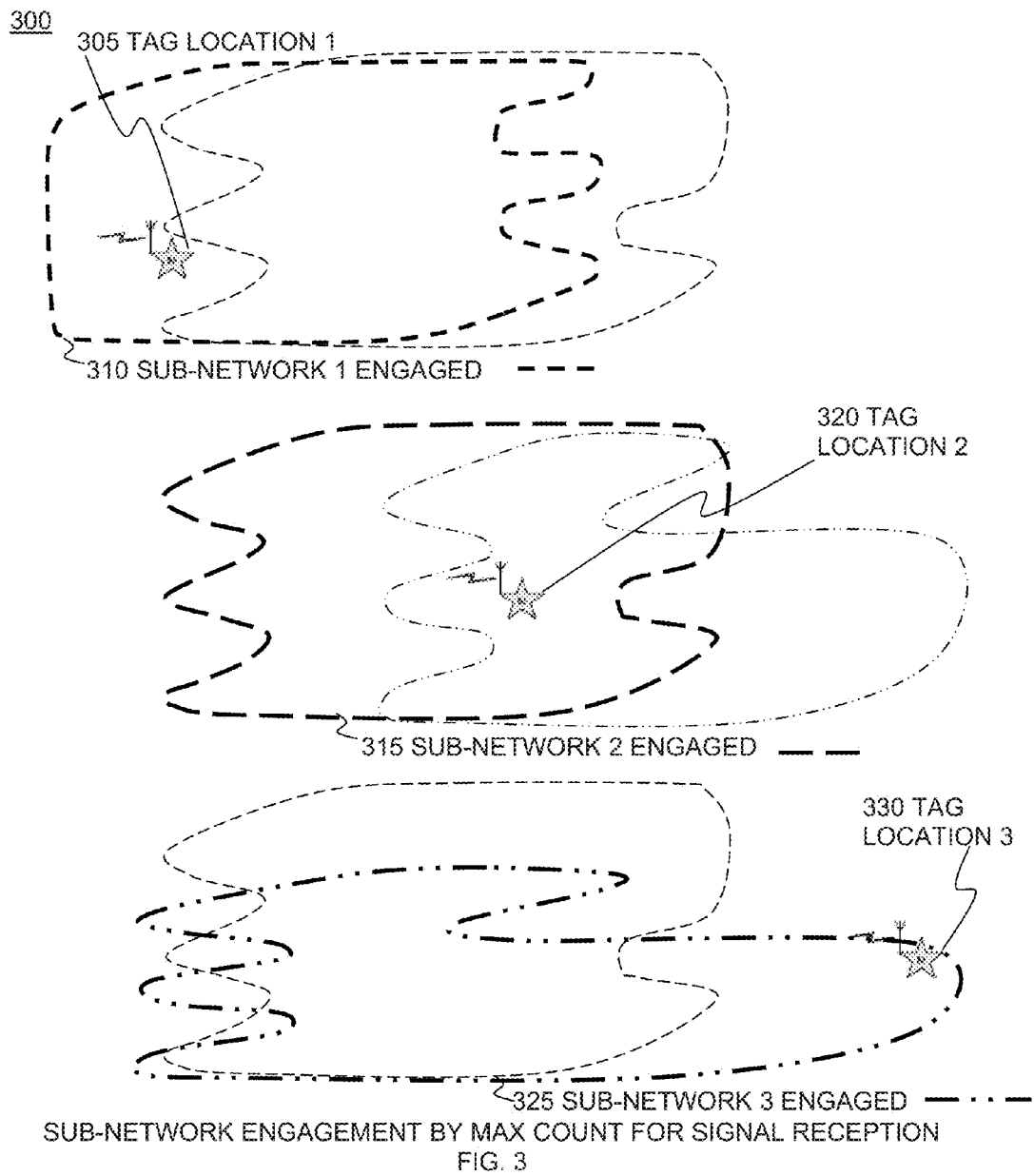
FIG. 3 is a depiction of a mobile device/tag moving through the topology of overlapping sub-networks configured in accordance with an embodiment of the invention.

FIG. 3 depicts a mobile device/tag moving through a topology of overlapping sub-networks 300. The topology is from FIG. 2. Initial tag location 305 is within sub-network 1 (heavy short dashed line) 310. Next tag location 320, is within sub-network 2 (heavy long dashed line) 315. Third tag location 330, is within sub-network 3 (heavy dot-dot-dash line) 325. In each case, for this embodiment, the sub-network having the greatest number of routers receiving the tag's signal is engaged to perform the location detection determination for the tag.

Figure 4:
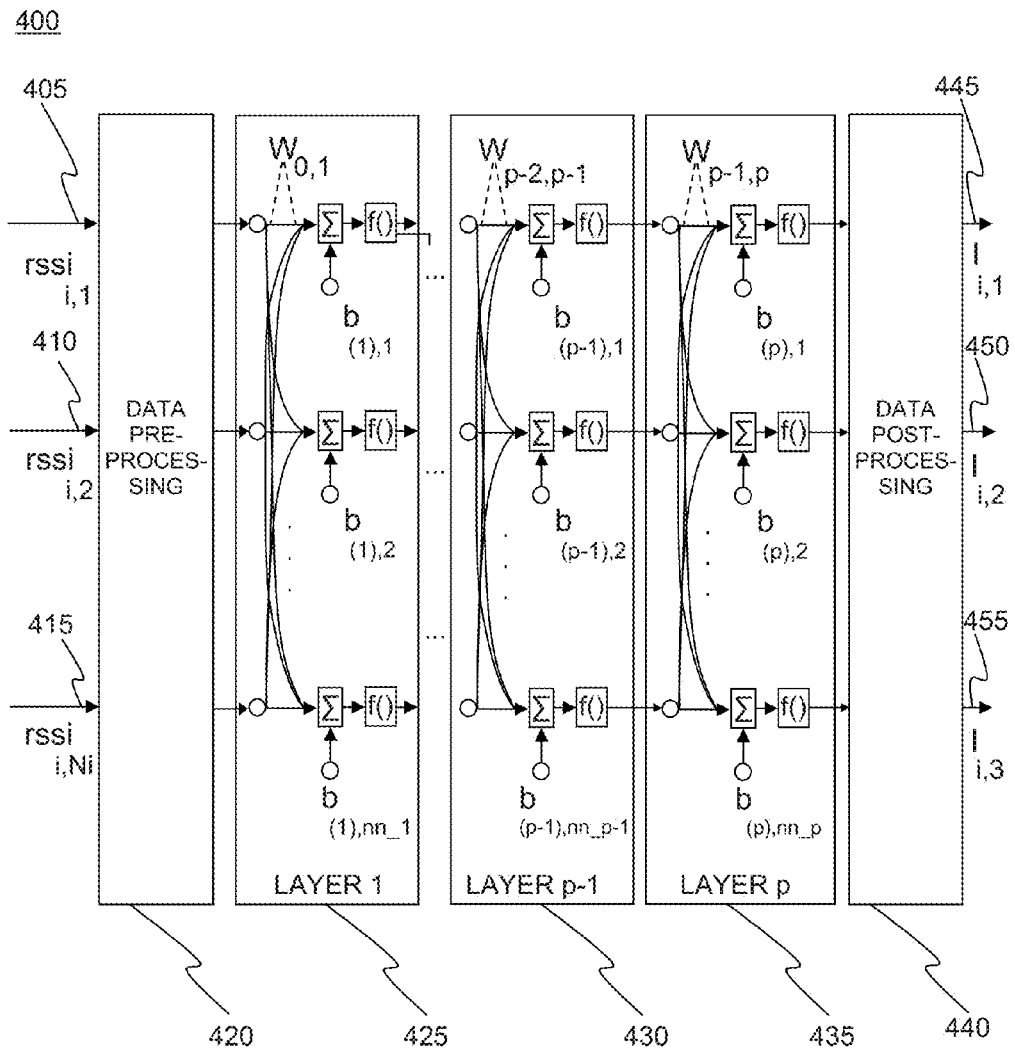
FIG. 4 is a depiction of a configuration of a feed-forward neural network architecture of each sub-network in accordance with an embodiment of the invention.

FIG. 4 depicts an embodiment for a feed forward neural network architecture 400 of each sub-network. Components comprise Input 405, 410, and 415 to Data Pre-Processing 420; Layer 1 425; Layer p−1 430; Layer p 435; Data Post-Processing 440; and Output 445, 450, and 455. The network architecture depicted in FIG. 4 demonstrates a neural network of feed-forward architecture, although no assumption or restriction is made that could prevent using another type of neural model. Each sub-network has Ni inputs, p layers (a p-layer network is commonly referred to as a network with one output and p−1 hidden layers), and a maximum of three outputs. An alternative embodiment comprises a 4th, time, dimension. Embodiments use time not only for compensating for slow moving variations in the environment, but also for making predictions. As a nonlimiting example, embodiments of the system refine location accuracy by observing set routines such as a nurse repeatedly traveling between the nurse's station and exam rooms. Each neural layer has a certain number of neurons—processing units—and their number can be different for different network layers. The synaptic weights of the network, the transfer function $f()$ along with the bias vectors, determine the response of each neural layer to the inputs received from the previous one or fed back from later layers. This response can be described in a matrix form as:

$$s_i = f(W_{i-1,i} s_{i-1} + b_i) \qquad (2.2)$$

where matrix $W_{i-1,i}$ represents the network connection matrix fors layers i−1 and i, $s_i$ is the signal output from layer i, ($s_{i-1}$ layer i−1) and $b_i$ is the bias vector in the form:

$$b_i = \begin{bmatrix} b_{(i),1} \\ b_{(i),2} \\ \vdots \\ b_{(i),nn\_i} \end{bmatrix} \qquad (2.3)$$

The number of neurons in layer i is denoted as nn_i. The transfer function $f(\ )$ can have one of the few standard forms. One example is the tan-sigmoid transfer function:

$$f(x) = \frac{2}{1+e^{-2x}} - 1 \qquad (2.4)$$

In embodiments, two blocks—signal pre-processing 420 and signal post-processing 440, are employed to normalize the data to the range suitable for neural-network processing. Normalization parameters are determined during network training and depend on the training data vectors at the network input and target vectors at the network output. In the case of embodiments of the model addressed herein, these parameters are influenced by the effective RSSI range as received on sub-network routers during the training phase.

Figure 5:
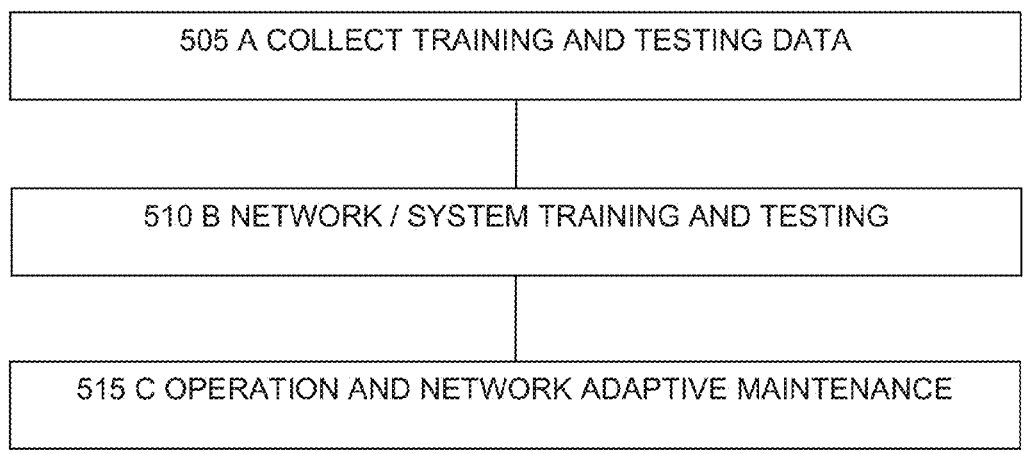
FIG. 5 is a depiction of a flow chart of system deployment phases configured in accordance with an embodiment of the invention.

FIG. 5 flowchart 500 depicts the three system deployment phases. As mentioned, system deployment embodiments consist of three phases. A comprising collection of training and testing data 505; B comprising network/system training and testing 510; and finally C comprising operation and network adaptive maintenance 515. After all router units are installed in the particular environment, training data is collected through physical measurement sampling, mathematical modeling, or a combination of both. The sampling procedure consists of capturing the RF signal characteristics from known locations determined by the x, y and z coordinates in the space of interest. For embodiments, sampling is implemented through the transmission of bursts of packets from a given location. Bursts contain a reasonable number of transmissions (10-30, for example) in order to properly characterize the signal strength for given location. The sampling process can potentially be repeated for specific time intervals (hour(s), day, month . . . ) in order to acquire temporal variations in the environment that are related to RF signal propagation. Each sampling packet has a unique identifier enabling the system to recognize and interpret the packet structure. All routers that receive the sampling packet extract the information content and relay it further to the central server which stores the sampled data. The information of interest, in embodiments, comprises the RSSI as received at each router/mobile transceiver and current mobile transceiver location. Also, the information on routers that did not receive the sampling packet from the particular (x, y, z) location—i.e. the routers that timeout—is recorded.

Figure 6:
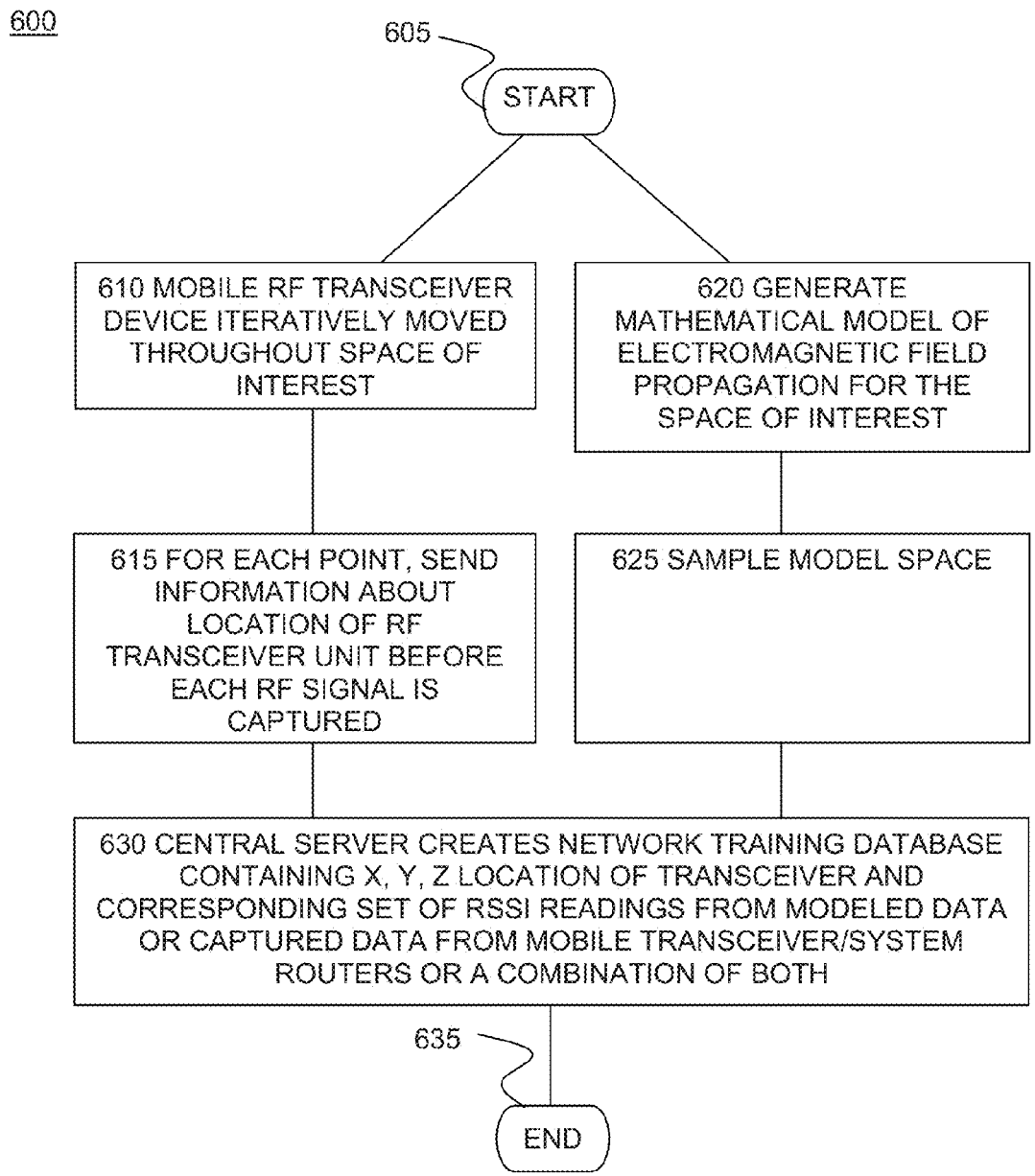
FIG. 6 is a depiction of a flow chart of electromagnetic field strength sampling configured in accordance with an embodiment of the invention.

FIG. 6 is a flow chart 600 depicting overview steps of sampling for an embodiment. During the sampling process, at start 605, a mobile transceiver device (in embodiments an RFID tag) is physically moved incrementally throughout the space of interest 610. Information about the location of the sampling unit is sent to the central sever before each sampling data burst is captured 615. In parallel, a mathematical model of electromagnetic field propagation is generated for the space of interest 620, and model space is sampled 625. The central server creates a network training database containing the x, y, z location of the transceiver and a corresponding set of RSSI readings from the modeled data or captured data from mobile transceiver/system routers or a combination of both 630, ending the sequence 635. The structure of an embodiment of this data set is shown in Table 1.

TABLE 1

| Sampling data structure | | | | | | | | |
|---|---|---|---|---|---|---|---|---|
| Tag ID | X | Y | Z | Router 1.1 | Router 1.2 | Router 2.1 | Router 2.2 | ... ... |
| 000B | 17 | 236 | 17 | −65 | −68 | −58 | −57 | |
| 000A | 24 | 128 | 38 | −48 | −51 | −61 | −63 | |
| 000B | 26 | 324 | 17 | NaN/−99 | NaN/−99 | −64 | −61 | |
| 000B | 26 | 324 | 17 | ... | ... | ... | ... | |

In embodiments, the spatial locations of the training data collection are either random or structured as a regular grid-like pattern. For some embodiments, the sampling is taken about every 3 feet. Other embodiments use a cluster of mobile transceivers with a single x, y, z location selected.

Each system sub-network has its own spatial domain with boundaries defined as:

$$x_{MIN} \leq x \leq x_{MAX}$$

$$y_{MIN} \leq y \leq y_{MAX}$$

$$z_{MIN} \leq z \leq z_{MAX} \qquad (2.5)$$

The training of each sub-network is performed by using the training data that belongs to that (sub-) network's domain. The inputs to the network are feature vectors containing the RSSI (and/or other parameter) values from the readers belonging to the specific network. The target outputs are x, y and z coordinates of the tag associated with input vector. An embodiment implementation of training is accomplished by MATLAB Neural Toolbox®. MATLAB® and MATLAB Neural Toolbox® are registered trademarks of MathWorks, Inc., Corporation of California. Training of the network is performed according to the scaled conjugate gradient method, while backpropagation is used to obtain the derivatives of performance with respect to the connection weights and bias vectors of the network. The MATLAB Neural Toolbox® implementations of neural network training contain a model for data pre and post processing. Once the training of the network is completed, several sets of matrices/coefficients are generated. They represent the data pre and post processing parameters, network connection weights, and network bias vectors.

Figure 7:
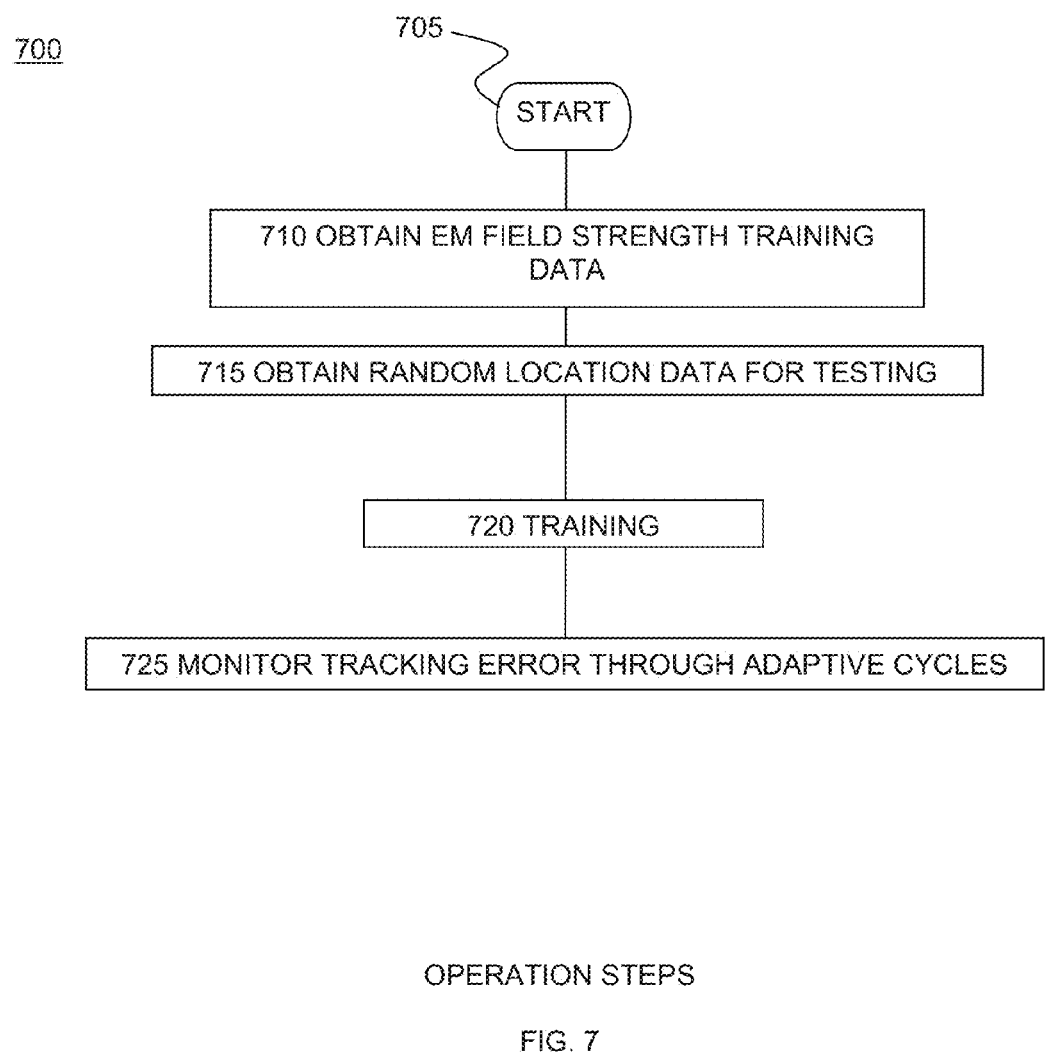
FIG. 7 is a flow chart of overall operation steps configured in accordance with an embodiment of the invention.

FIG. 7 flow chart 700 depicts overall operation steps including start 705, obtaining EM field strength sample training data step 710, obtaining data from random locations 715, training 720, and operation and monitoring tracking error through adaptive cycles 725. Further details follow.

Once training data is obtained 710, an additional set of data with a format identical to the training data is obtained from random spatial locations 715. This data set is employed to test network performance.

After the network is deployed, tracking error is monitored through periodic adaptive cycles 725 by correcting the network outputs based on readings from transmitters placed at known locations. These transmitters are called reference units and they provide run-time training and adaptation data.

Location Model Deployment Configuration

This section describes an embodiment of the method for simulation of neural network outputs in order to determine the tag location based on a set of received RSSI readings. For each system sub-network, the processing application loads the content of text files representatively denoted as follows: B1, B2, B3, B4, IN, LW12, LW23, M, max_X, max_Y, max_Z, OUT, subnetConfig, targetMag, V, xMax1, xMax2, xMin1, xMin2, yMax1, yMax2, yMin1, yMin2 (z). In embodiments, all of the above mentioned files are generated during system training. For a system with three hidden layers, they have the following interpretation:

B1, B2, B3, B4 contain network bias vectors;

IN is the input connection weight matrix;

LW12 and LW23 are connection matrices between layers 1-2 and 2-3, respectively;

OUT is the connection matrix between layer 3 and output layer;

M and V are mean and variance normalization parameters for input RSSI data, in embodiments;

max_X, max_Y and max_Z are maximum coordinate spans in x, y and z directions of the network;

subnetConfig contains the network configuration parameters described in Table 2 below;

targetMag is the neural network maximum output;

xMax1, xMax2, xMin1, xMin2, yMax1, yMax2, yMin1, yMin2 (optionally z) are data normalization parameters used with, for example, the MATLAB Neural Toolbox®. These parameters are obtained based on the maximum and minimum training data values as well as the desired data range at the output of the input layer and the input of the output layer. The structure of an embodiment of the subnet Configuration text file is depicted in Table 2.

TABLE 2

Structure of a network configuration file

| Field structure | Explanation |
| --- | --- |
| Network name, 0.0 | Network name, 0.0 |
| Customer ID, 0 | Customer unique identifier |
| Building ID, 0 | Building unique identifier |
| xMin, 0.0 | Minimum x coordinate covered by the network |
| xMax, 90.0 | Maximum x coordinate covered by the network |
| yMin, 0.0 | Minimum y coordinate covered by the network |
| yMax, 92.0 | Maximum y coordinate covered by the network |
| zMin, 4.0 | Minimum z coordinate covered by the network |
| zMax, 4.0 | Maximum z coordinate covered by the network |
| MAC1 MAC2 ... | List of MACs of routers that are part of the particular network |

Figure 8:
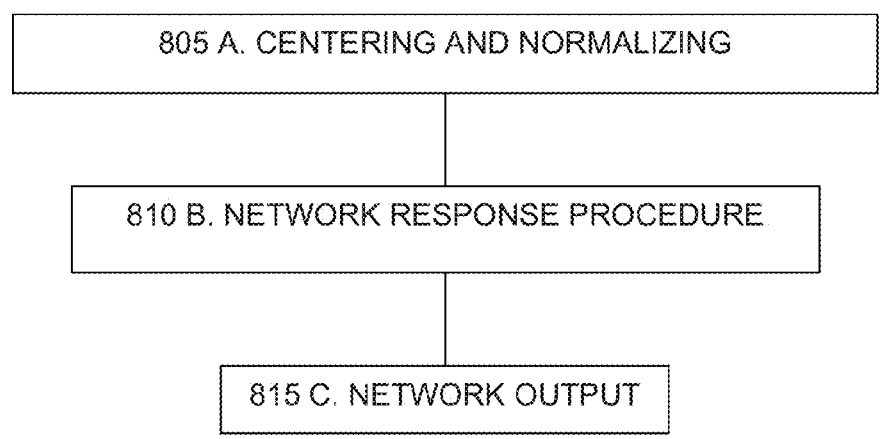
FIG. 8 is a flowchart of network output computation steps configured in accordance with an embodiment of the invention.

FIG. 8 flowchart 800 depicts the steps whereby each of the network's outputs is computed. For embodiments, this is accomplished by implementing the steps of: A comprising centering and normalizing 805; B comprising network response procedure 810; and C comprising network output 815 (4 layer network assumed). Details follow.

A. Centering and Normalizing

Before being processed by the neural network, all RSSI data represented by the vector in Rssi [Ni×1] is centered and normalized. Embodiments of this process comprise:

a. Load normalization parameters M [Ni×1] and V [Ni×1]; and b. Calculating centered-normalized vector as: in=(in Rssi−M)./V where—is standard matrix subtraction while ./ is per-element vector division. For embodiments, the mean M and variance V normalization vectors can be omitted (i.e. M is null vector while V is unit vector); MATLAB Neural Toolbox® can implement normalizing the input data.

B. Network Response

After reading the input parameters, the following procedure yields the network response for embodiments.

Figure 9:
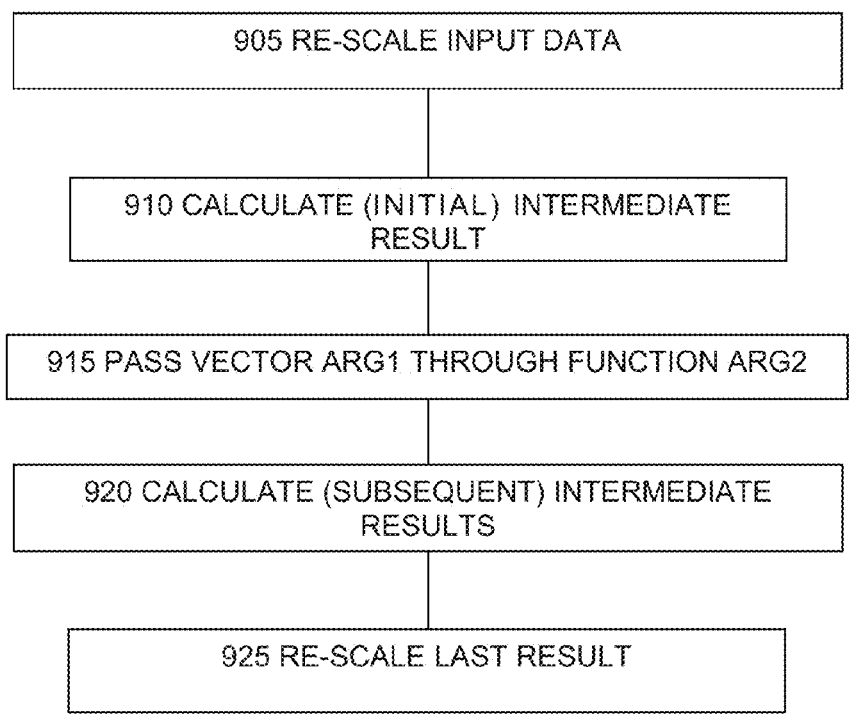
FIG. 9 is a flow chart of steps for network response of step 810 of FIG. 8 configured in accordance with an embodiment of the invention.

FIG. 9 flowchart 900 summarizes the steps included in the network response procedure of FIG. 8, step 810. Network response steps comprise: Re-scaling the input data 905, Calculating (initial) intermediate result 910, Passing the vector arg1 through function arg2 915, Proceed with calculation of the following (subsequent) intermediate results 920, and Re-scaling the last result 925. Details of the network response steps follow.

1. Re-scale the input data according to the formula:

$$out1=(y\text{Max}1-y\text{Min}1)*(in-x\text{Min}1)./(x\text{Max}1-x\text{Min}1)+y\text{Min}1$$

where: ./ represents per-element matrix division, − represents per-element matrix subtraction, * represents scalar times matrix operation and + represents addition of the constant term to each element of the matrix;

2. Calculate the (initial) intermediate result according to:

$$arg1=(\text{IN}*out1)+B1$$

where all operation are standard matrix operators;

3. Pass the vector arg1 through function:

$$arg2=2/(1+\exp(-2*arg1))-1$$

where the transform is calculated on each element of arg1;

4. Proceed with calculation of the following (subsequent) intermediate results:

$$arg3=(LW12*arg2)+B2;$$

$$arg4=\text{tansig}(arg3); \quad \text{where} \quad \text{tansig}(x)=2/(1+\exp(-2*x))-1$$

$$arg5=(LW23*arg4)+B3;$$

$$arg6=\text{tansig}(arg5);$$

$$arg7=(\text{OUT}*arg6)+B4;$$

$$arg8=\text{tansig}(arg7);$$

5. Re-scale the last result according to the formula:

$$out\text{Final}=(x\text{Max}2-x\text{Min}2).*(arg8-y\text{Min}2)./(y\text{Max}2-y\text{Min}2)+x\text{Min}2$$

where first—is subtraction of two vectors, .* represents per element multiplication of two matrices, arg8−yMin2 subtracts constant from each vector component, ./ is per element division, and the last + is standard vector+vector operation.

C. Network Output

The output of the network is a two or three component vector with all components in the range [−1, 1]. The calculation of the (x, y) tag position is accomplished by using the following procedure:

$$x\text{Feet}=(out\text{Final}(1)/(2*\text{targetMag})+0.5)*\text{max\_}X+x\text{Min};$$

$$y\text{Feet}=(out\text{Final}(2)/(2*\text{targetMag})+0.5)*\text{max\_}Y+y\text{Min};$$

$$z\text{Feet}=(out\text{Final}(2)/(2*\text{targetMag})+0.5)*\text{max\_}Z+z\text{Min};$$

where xMin, yMin and zMin represent the minimum x, y and z coordinates covered by the local (sub-) network. Parameters max_X, max_Y and max_Z are already provided in the (sub-) network parameter files; they are:

$$max\_X = xMax - xMin;$$

$$max\_Y = yMax - yMin;$$

$$max\_Z = zMax - zMin;$$

where xMax, yMax and zMax represent maximum x and y coordinates covered by the local network.

Note that if parameter max_Z is 0, the network has only two active outputs and it covers only one floor (or only two dimensions). In this case, the output zFeet can be set to:

$$zFeet = zMin;$$

The process of choosing the particular sub-network (out of all possible sub-networks) to activate consists of choosing the sub-network with highest number of routers that received packet(s) from the particular transmitter (highest number of non NaN or −99 readings).

Data Collection, System Training and Network Generation

The generation of system neural networks is performed, for example, by using MATLAB® based scripts such as:
 train Overlap
 test Overlap
 create Golden Vector
 exclude Data Points
 merge Chip 12 (*)

A sampling procedure precedes the actual network training. This process was initially described in the Location Detection Model section. The sampling procedure is accompanied by careful coordinate verification in the area where the system is installed. In embodiments, samplings are distributed along a regular grid, with the distance between adjacent samplings being 3 feet. In other embodiments, regular grid spacing is not employed. For embodiments, a separate application (MapReader) reads a map of the facility and displays the current coordinate. It can be used to verify the sampling location, i.e. x, y and z coordinates. It is also possible to use reference coordinate labels in each room of the facility for easier orientation during the sampling process. In embodiments, the minimum number of packets to process/receive during each sampling burst is 20 (this can vary). Two groups of data are collected in embodiments: 1 a larger set of sample training data sampled every three feet throughout the entire installation space, and 2 a set of random points (100-200) that serve as test data to validate the network training results. The following represents embodiment details to address before and during the sampling procedure.

Sampling

Figure 10:
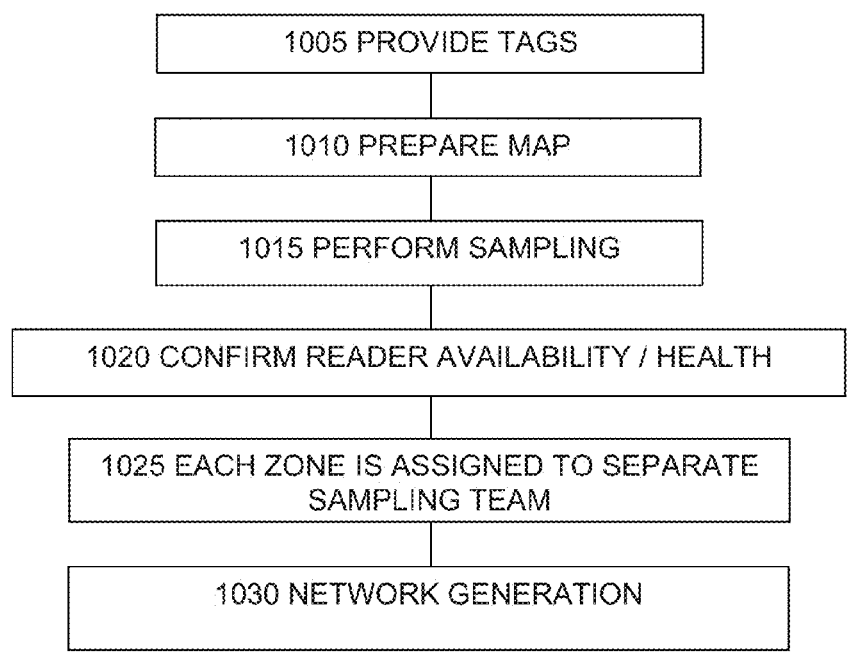
FIG. 10 is a flow chart of sampling steps configured in accordance with an embodiment of the invention.

FIG. 10 flowchart 1000 depicts more detailed steps of a sampling method. Providing a sufficient number of sampling tags; Test/calibrate the sampling tags to verify that they all produce similar RSSI readings an all routers 1005. Preparing a map or maps of the facility where the system will be installed 1010. In embodiments, the maps are exported into png format, for example, if a MapReader application is used to validate the map accuracy. After the origin point is chosen on the map, the map scale is confirmed by choosing few points in the area (room corners or corner points along large corridors if possible) and measuring the distance between them while comparing those readings with map data. Sampling is performed by using WiFi connectivity and PocketPC devices or laptop computers, for example 1015. Facility WiFi access availability is confirmed, ensuring that the sampling server application communicates seamlessly with all PDAs and laptops that will be used during the sampling procedure. The health status of readers should be confirmed and available at all times in order to make sure that sampling data is valid 1020. There should be clear separation of sampling zones (e.g. by rooms, corridors or simply by the value of coordinates), and each zone should be assigned to separate sampling team 1025. After the sampling procedure is completed, network generation can take place 1030. In embodiments, setup files are located in a net Config folder for system training software. Embodiment examples are:
 main config text file
 test config text file
 router config csv file An embodiment of the structure of a main configuration text file is given in Table 3.

TABLE 3

Structure of the main configuration text file

| Field Name, Field Value (example) | Explanation |
|---|---|
| train data file, .\data\traindata.csv | Location and name of the file with training data - all locations are relative to the folder where trainOverlap.m file resides. |
| test data file, .\data\testdata.csv | Location and name of the file with test data |
| router config file, .\netConfig\routerconfig.csv | Location and name of the file with the list of the routers in the system |
| network config base name, .\netConfig\dhmc_102109_subnet_ | Location and name of the base name for all network names in the system. In this case for 2 networks would have dhmc_102109_subnet_1 and dhmc_102109_subnet_2 networks to train. |
| num networks, 2 | The number of networks in the system. |
| num neurons layer 1, 128 | The number of neurons in layer 1 of each network. |
| num neurons layer 2, 64 | The number of neurons in layer 2 of each network. |
| num neurons layer 3, 32 | The number of neurons in layer 3 of each network. |
| test network, true | The flag specifying if the script trainOverlap.m will test the network(s) or not. |
| save data, true | The flag specifying if the script trainOverlap.m will save trained network(s) or not. |
| create golden vector, false | The flag specifying if the script trainOverlap.m will create golden vector data or not. |

TABLE 3-continued

Structure of the main configuration text file

| Field Name, Field Value (example) | Explanation |
|---|---|
| decimate data, 0 | The parameter specifying if the script trainOverlap.m will decimate the input data - if >1 the decimation will take place and decimation factor is actually this parameter itself. |
| fix unknowns, false | The parameter specifying if −99 readings (no packet received) will be replaced with value determined by MATLAB's fix unknowns function from neural toolbox. |
| exclusion map name, .\netConfig\DHMC_24_Grid Model_ patient_exclusion_300dpi_binary.png | The name of the binary exclusion map-the black areas are zones where the tags can not be present in the system (exclusion zones). |
| excl map pixel origin x, 552 | X location of the coordinate origin in pixels on the map (second MATLAB parameter for images). |
| excl map pixel origin y, 2212 | Y location of the coordinate origin in pixels on the map (first MATLAB parameter for images). |
| excl origin real x, 0 | X coordinate of the origin point in feet. |
| excl origin real y, 0 | Y coordinate of the origin point in feet. |
| excl map pixel ref x, 3186 | X location of the reference point in pixels on the map (second MATLAB parameter for images). |
| excl map pixel ref y, 2212 | Y location of the reference point in pixels on the map (first MATLAB parameter for images). |
| excl ref real x, 333.7711 | X coordinate of the reference point in feet. |
| excl ref real y, 0 | X coordinate of the reference point in feet. |
| excl map floor coordinate, 43 | Exclusion map floor coordinate. |

Table 3 presents the structure of an embodiment of the main configuration text file for configuration of the script for training overlap.

In embodiments, the comma separated values (csv) file for router configuration contains the list of all deployed routers/readers in the system and the structure of this file is shown in Table 4 (all fields in the file are separated by commas).

TABLE 4

Router configuration file structure

| Physical Address | Internet Address | X coord. | Y coord. | Z coord. | Version |
|---|---|---|---|---|---|
| 00.1A.B8.00.02.1C | 192.168.111.2 | 0 | 45 | 8 | 4 |
| 00.1A.B8.00.02.1E | 192.168.111.3 | 55 | 41 | 8 | 4 |
| 00.1A.B8.00.02.2A | 192.168.111.4 | 55 | 41 | 8 | 4 |
| 00.1A.B8.00.02.2C | 192.168.111.5 | 55 | 41 | 8 | 4 |
| ... | ... | ... | ... | ... | ... |
| 00.1A.B8.00.02.2E | 192.168.111.6 | 55 | 41 | 8 | 4 |

In embodiments, before the network training is performed a priori, the area where the system is deployed is divided into N potentially overlapping networks. For each sub-network, a configuration file of the structure described in Table 2 of the above section on Location Model Deployment Configuration is created. In embodiments, these sub-network files are named according to the name given by the network configuration base name parameter in the main configuration text file. For example, if the network configuration base name parameter has the value "network_Alpha_" and the parameter num networks has a value of "3", then three configuration files are created with the names: network_Alpha_1, network_Alpha_2, and network_Alpha_3.

In embodiments, network training is performed by running the train Overlap script. During the training, the program selects appropriate datasets for each system sub-network, trains each network, and saves network coefficients and configuration files in a folder named "saved". Each sub-network is saved in the separate subfolder whose name corresponds to the name of that particular sub-network. These files are provided to the tracking layer services during the final system deployment. In embodiments, when the test network field in the main configuration text file is set to true, the trained networks are tested by using the specified testing data set. In embodiments, the resulting average absolute error is displayed in a MATLAB® prompt. Also, an absolute error histogram is shown in a separate figure in embodiments. For large data sets (40,000 training samples), network training can involve approximately one-half hour (3 GHz quad core Intel Xeon processor w/ 4 GB system RAM). Should network training not converge, the training process is repeated. For embodiments, nonconvergence is identified by the average absolute error being relatively large (>12 feet). In addition to network coefficients, embodiments of the training program create a log file with the name consisting of the network configuration base name parameter followed by _X and the date and time of training. For embodiments, this file contains data such as router configuration, network coefficients, and network configuration setup in the form of MATLAB® variables that can be directly loaded to the MATLAB® workspace.

In embodiments, a separate script, test Overlap, is used to test any previously trained network. The configuration file for this script is a test configuration text file. The structure of embodiments of this file is shown in Table 5.

TABLE 5

The structure of a test configuration text file

| Field Name, Field Value (example) | Explanation |
|---|---|
| test data file, .\data\testdata.csv | Location and name of the file with test data - all locations are relative to the folder where trainOverlap.m file resides. |
| log file, .\log\dhmc_102109_subnet_X_201002 04T135702 | Location and name of the file with network to be tested - the file is in mat format. |
| show bias, false | The flag show bias displays the actual location and the location determined by the neural network. |

TABLE 5-continued

The structure of a test configuration text file

| Field Name, Field Value (example) | Explanation |
| --- | --- |
| show map error, false | The flag show map error determines if the test locations w/ errors beyond a threshold will be shown on the map (red for locations w/ error beyond threshold). |
| error threshold, 15.0 | Error threshold parameter in feet. |
| map name, .\netConfig\DHMC_24_grid_Model_300dpi.png | The location and name of the map used to display error and possibly sampling data. |
| map pixel origin x, 552 | The x coordinate of the pixel in the map corresponding to the origin point (second MATLAB coordinate). |
| map pixel origin y, 2212 | The y coordinate of the pixel in the map corresponding to the origin point (first MATLAB coordinate). |
| origin real x, 0 | Origin x coordinate in feet. |
| origin real y, 0 | Origin y coordinate in feet. |
| map pixel ref x, 3186 | The x coordinate of the pixel corresponding to the reference point in the map. |
| map pixel ref y, 2212 | The y coordinate of the pixel corresponding to the reference point in the map. |
| ref real x, 333.7711 | The x coordinate of the reference point in feet. |
| ref real y, 0 | The y coordinate of the reference point in feet. |
| map floor coordinate, 43 | The floor coordinate of the map. |
| scatter sampling only, false | The parameter used to show the sampling data as the scatter plot on the map. |
| exclusion map name, .\netConfig\DHMC_24_Grid_Model_patient_exclusion_300dpi_binary.png | The location and name of the exclusion map - the map is binary image with values 256 for allowed locations and values 0 for exclusion zones. |
| excl map pixel origin x, 552 | The configuration data used for exclusion map setup - these directly correspond to those used for error/sampling map setup. |
| excl map pixel origin y, 2212 | The configuration data used for exclusion map setup - these directly correspond to those used for error/sampling map setup. |
| excl origin real x, 0 | The configuration data used for exclusion map setup - these directly correspond to those used for error/sampling map setup. |
| excl origin real y, 0 | The configuration data used for exclusion map setup - these directly correspond to those used for error/sampling map setup. |
| excl map pixel ref x, 3186 | The configuration data used for exclusion map setup - these directly correspond to those used for error/sampling map setup. |
| excl map pixel ref y, 2212 | The configuration data used for exclusion map setup - these directly correspond to those used for error/sampling map setup. |
| excl ref real x, 333.7711 | The configuration data used for exclusion map setup - these directly correspond to those used for error/sampling map setup. |
| excl ref real y, 0 | The configuration data used for exclusion map setup - these directly correspond to those used for error/sampling map setup. |
| excl map floor coordinate, 43 | The configuration data used for exclusion map setup - these directly correspond to those used for error/sampling map setup. |

Table 5 the Structure of a Test Configuration Text File

When running the test Overlap script file, for embodiments, the average absolute error, number of wrong floor decisions, and absolute error histogram are displayed, except when the parameter show sampling only from the test configuration text file is set to true.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A scalable system for real-time location determination of at least one object by a plurality of sub-networks of interrelated neural networks comprising:
at least one transmitting tag associated with each said at least one object;
a plurality of a priori defined interrelated location classifier sub-networks of said interrelated neural networks comprising location classifier receivers;
said location classifier receivers configured to receive at least one transmission from said at least one transmitting tag;
wherein said system is configured to engage only one of said plurality of sub-networks of said interrelated neural networks to output a location of said at least one object;
whereby scaling of said system is achieved by engaging only one sub-network of said interrelated neural networks of said plurality of sub-networks of said interrelated neural networks to output said location for each of said at least one objects;
wherein said system is configured to select said engaged sub-network of said interrelated neural networks having a greatest number of said location classifier receivers receiving at least one transmission from said at least one transmitting tag; and
said at least one transmitting tag is configured to receive at least one signal from at least one router/base station/access point.

2. The system of claim 1, wherein said sub-networks of interrelated neural networks overlap spatially.

3. The system of claim 1, wherein said at least one transmitting tag is configured to receive at least one physical measurement value from at least one router/base station/access point and transmit said at least one physical measurement value to a system central server processing and command station.

4. The system of claim 2, wherein said at least one transmitting tag is configured to receive at least one physical measurement value from at least one router/base station/access point and transmit said at least one physical measurement value to a system central server processing and command station.

5. The system of claim 1, wherein said system is configured to collect training and testing data for deployment; use said training and testing data for system training and testing; and perform adaptive error monitoring and tracking.

6. The system of claim 5, wherein said configuration for adaptive error monitoring and tracking comprises monitoring tracking error through periodic adaptive cycles by correcting network outputs based on readings from reference transmitters at known locations.

7. The system of claim 1, wherein said system is configured to collect sampled data comprising recording identification of routers that did not receive a sampling packet from a particular spatial coordinate location.

8. The system of claim 1, wherein said sub-networks are configured for training comprising unfiltered or unsmoothed or unfiltered and unsmoothed data.

9. The system of claim 1, wherein said sub-networks do not spatially overlap.

10. A method for scalable real-time location determination of at least one object by sub-networks of interrelated neural networks comprising the steps of:
    defining said sub-networks of interrelated neural networks a priori;
    collecting training data by sampling;
    training said sub-networks of interrelated neural networks on said training data;
    testing said sub-networks of interrelated neural networks on said training data;
    whereby scaling of said method is achieved by operating said sub-networks of interrelated neural networks, engaging only one of said sub-networks to output a location of said at least one object;
    performing adaptive location error monitoring and tracking;
    wherein computation of each of said engaged sub-network's output comprises:
    centering and normalizing input data;
    calculating a network response; and
    calculating a sub-network output tag position from a network output vector.

11. The method of claim 10, wherein said sampling step comprises:
    repeating said sampling at specific time intervals to acquire temporal variations in an environment related to RF signal propagation.

12. The method of claim 10, wherein said step of training said sub-networks comprises a scaled conjugate gradient method, and backpropagation is used to obtain derivatives of performance with respect to connection weights and bias vectors of said sub-network.

13. The method of claim 10, wherein a network response comprises:
    re-scaling input data;
    calculating initial intermediate results;
    passing a vector arg1 through a function arg2;
    calculating subsequent intermediate results; and
    re-scaling a last result.

14. The method of claim 10, comprising processing variations in received signal strength indicator (RSSI) values with a Centroid k-means filter.

15. The method of claim 10, comprising processing variations in received signal strength indicator (RSSI) values with a median filter.

16. The method of claim 10, comprising processing variations in received signal strength indicator (RSSI) values with backfilling.

17. The method of claim 11, wherein a network response comprises:
    re-scaling input data;
    calculating initial intermediate results;
    passing a vector arg1 through a function arg2;
    calculating subsequent intermediate results; and
    re-scaling a last result.

18. The method of claim 10, wherein said computation of each of said sub-network's outputs comprises a sub-network transformation comprising:
    a location vector l equal to a neural-network transformation function $nn_i(\ )$ for a system sub-network i,
wherein said neural-network transformation function is a function of a vector ($rssi_i$) containing all received signal strength indicator (RSSI) readings from all routers/mobile transceivers that belong to said sub-network i.

19. The method of claim 10, wherein said computation of each of said sub-network's outputs comprises a neural layer response comprising:
    a network connection matrix $W_{i-1,i}$ comprising
    a signal output $s_i$ from a layer i, ($s_{i-1}$ layer i−1); and
    a bias vector $b_i$.

20. A scalable system for real-time location determination of at least one object by overlapping sub-networks of neural networks comprising:
    at least one transmitting tag associated with each said at least one object;
    said overlapping sub-networks comprising a plurality of flexible topology, a priori defined, interrelated sub-network location classifiers comprising receivers;
    receiving at least one transmission from said at least one transmitting tag at at least one of said receivers;
    processing said at least one received transmission in said overlapping sub-networks of neural networks on at least one central processing and command station;
    wherein only one of said sub-networks is engaged to output a location of said at least one object;
    whereby said scaling is achieved by said engaging only one sub-network of said plurality of sub-networks to output said location for each of said at least one objects; and
    wherein said system is configured to collect training and testing data for deployment, said deployment comprising said steps of receiving and processing;
    using said training and testing data for system training and testing of said sub-networks of neural networks; and
    performing adaptive location error monitoring and tracking.

* * * * *